Oct. 11, 1949.                S. SQUILLER                2,484,192
                     CONNECTOR FOR THIN WALL CONDUITS
                           Filed April 10, 1947

INVENTOR
Samuel Squiller
BY William D. Jaspert
ATTORNEY

Patented Oct. 11, 1949

2,484,192

UNITED STATES PATENT OFFICE 2,484,192

CONNECTOR FOR THIN WALL CONDUITS

Samuel Squiller, Pittsburgh, Pa.

Application April 10, 1947, Serial No. 740,577

2 Claims. (Cl. 285—161)

This invention relates to slip-on fittings for thin wall conduit or the like, and it is among the objects thereof to provide a slip-on fitting or connector by which the ends of conduits may be joined and locked in place against axial displacement, and in which the locking means will be of a character to permit removal of the conduit from the connector without destroying the same.

In the use of conduit or thin wall tubing for housing electrical conductors or the like, fittings known as connectors have been utilized to grippingly engage the end of the conduit and lock it against displacement, the locking means being such that the fitting or conduit would have to be destroyed to disconnect the same.

In accordance with the present invention the locking means of the connector is of such character that while it grippingly engages and locks the end of a conduit the conduit may be removed from the fitting as desired without destroying the locking means.

Figure 1:
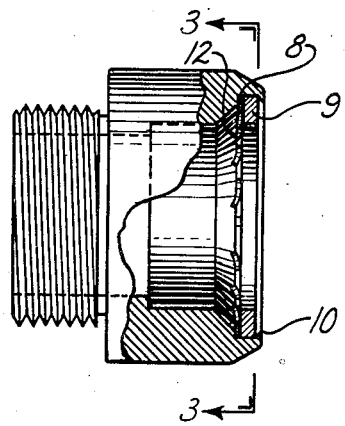
Figure 2:
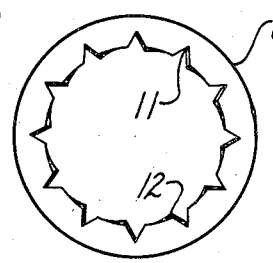
Figure 3:
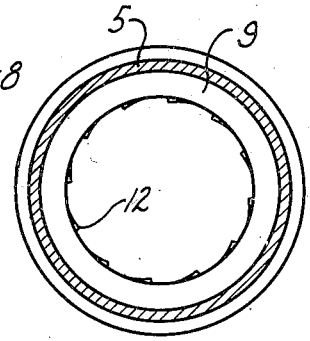
Figure 4:
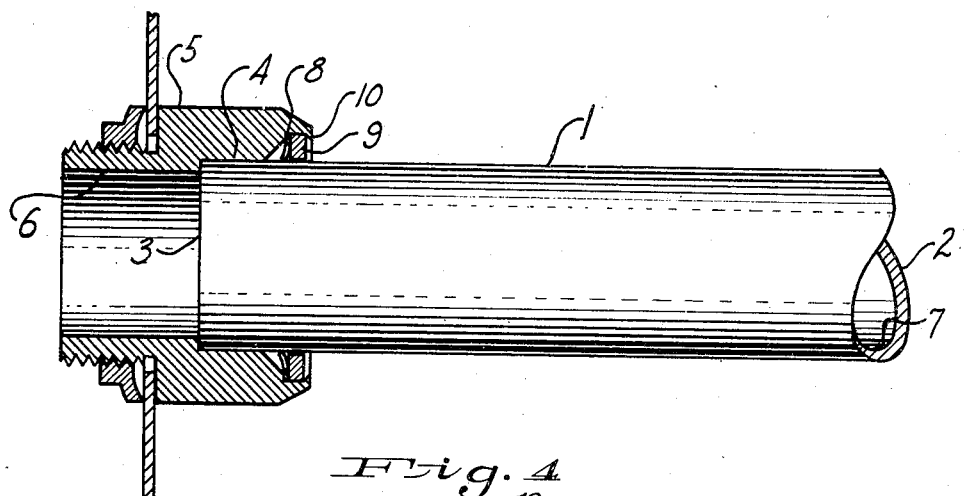
Figure 5:
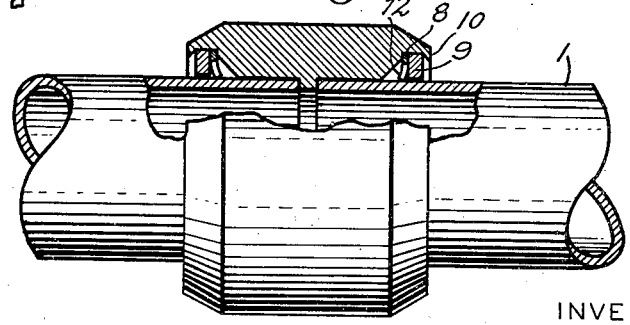

The invention will become more apparent from a consideration of the accompanying drawing, constituting a part hereof, in which like reference characters designate like parts, and in which Fig. 1 is a side elevational view, partially in section, of a connector or fitting for use in locking the ends of conduits embodying the principles of this invention;

Fig. 2 a front elevational view of a lock ring employed in the connector of Fig. 1;

Fig. 3 a front elevational view of the connector taken along the line 3—3, Fig. 1;

Fig. 4 a side elevational view, partially in cross-section, of a connector and conduit assembly; and Fig. 5 a front elevational view partially in cross section of a double connector embodying the principles of this invention.

In the drawing the numeral 1 designates a thin wall conduit cut away at 2 and having a flat end 3 which is disposed in a cylindrical counterbore 4 of a connector 5, the cylindrical bore 6 of the connector being of the same diameter as the inner bore 7 of the thin wall conduit 1. In accordance with the present invention the conduit 1 is locked in the connector 5 by a lock ring 8 held in place by a collar 9 that is secured by crimping over the end 10 of the connector 5 as shown. The lock ring is so assembled in the connector preliminary to the insertion of the thin wall conduit 1 as shown in Fig. 1 of the drawing.

As shown in Fig. 2, the lock ring is a thin metal ring having V-notches 11 and having the section between adjacent notches displaced as shown at 12, the displaced portions forming lip-like members which grip the outer wall of the conduit when it is inserted therein. The feature of the invention which permits removal of the conduit without destroying the locking ring 8 is the disposition of the lip 12 at a pitch angle similar to a thread, all of the lips being disposed in the same direction at either a left or right-hand angle. By so disposing the gripping lips 12 the conduit can be removed from the connector by simply turning it in the same direction as the angle of the lip which results in a surface creeping of the conduit out of and until it has cleared the connector fitting without destroying the locking ring. The conduit may then again be locked in the same fitting by simply sliding it therein and may, of course, be subsequently removed as often as is desired.

By means of the inclined lips of the locking ring which are distorted at a pitch angle, a great deal of waste incident to the use of thin wall conduit and fittings will be eliminated because in conventional practice both the thin wall conduit and the connector piece would be destroyed if it becomes necessary to break the joint.

Although one embodiment of the invention has been herein illustrated and described, it will be evident to those skilled in the art that various modifications may be made in the details of construction without departing from the principles herein set forth.

I claim:

1. A connector for thin wall conduit having a cylindrical bore of substantially the same diameter as the conduit and having a cylindrical counterbore of substantially the outer diameter of said conduit, a recess in said connector for receiving a lock ring having an inner diameter less than the outer diameter of said conduit, a flat lock ring in said recess having radial V-notches angularly disposed forming segments therebetween, and fastening means for said lock ring, said segments being flared at an angle on one side only of said ring whereby upon insertion of the conduit in its cylindrical counterbore said segments engage the outer surface of the conduit to prevent removal thereof from the connector by forces acting axially of the conduit while permitting removal of the conduit by a turning motion in the direction of angular disposition of said segment portions.

2. In a connector for cylindrical bodies having a cylindrical bore of the size of the body to be connected and having an enlarged portion for receiving a locking ring, a flat locking ring disposed in said enlarged bore portion having angularly spaced notches with the portions between said notches bent at an angle on one side only of said ring, and retaining means for said locking ring comprising a second locking ring abutting said first-named locking ring secured in the connector by crimping over the end of the connector.

SAMUEL SQUILLER.

REFERENCES CITED

The following references are of record in the file of this patent:

UNITED STATES PATENTS

| Number | Name | Date |
| --- | --- | --- |
| 2,158,757 | Kuestermeier | May 16, 1939 |

OTHER REFERENCES

Serial No. 467,153, Mueller (A. P. C.), published July 13, 1943.